Nov. 11, 1969  W. A. LADWIG, JR  3,477,534
TWO TRACTOR SIDE-BY-SIDE HOOKUP
Filed Dec. 7, 1967  2 Sheets-Sheet 1

INVENTOR.
WILLIAM A. LADWIG, JR.
BY
Victor J. Evansko
ATTORNEYS

Nov. 11, 1969   W. A. LADWIG, JR   3,477,534
TWO TRACTOR SIDE-BY-SIDE HOOKUP
Filed Dec. 7, 1967   2 Sheets-Sheet 2

Fig. 2.

INVENTOR.
WILLIAM A. LADWIG, JR.
BY
Victor J. Evansko
ATTORNEYS

# United States Patent Office 3,477,534
Patented Nov. 11, 1969

3,477,534
TWO TRACTOR SIDE-BY-SIDE HOOKUP
William A. Ladwig, Jr., P.O. Box 881,
Lusk, Wyo. 82225
Filed Dec. 7, 1967, Ser. No. 688,897
Int. Cl. B60d 1/16, 1/00; B62d 11/00
U.S. Cl. 180—14                              3 Claims

ABSTRACT OF THE DISCLOSURE

The side-by-side hookup for two tractors provides an arrangement so that there is a single front axle, means for pulling a load device from a center point of the two tractors, and in which there is a single drawbar and in which there are several broken joints intermediate the rear drawbar and the single front axle, so each tractor can twist or turn one way conjointly with the other and still pull evenly and not place a strain on any part of the main frame of the arrangement, and in which the device can be removed so that the tractors can be returned to the normal operation by jacking up the front axle, taking out the two bolts and pins thereof and replacing the front wheels, which can be done in about 55 minutes to one hour.

---

Figure 1:
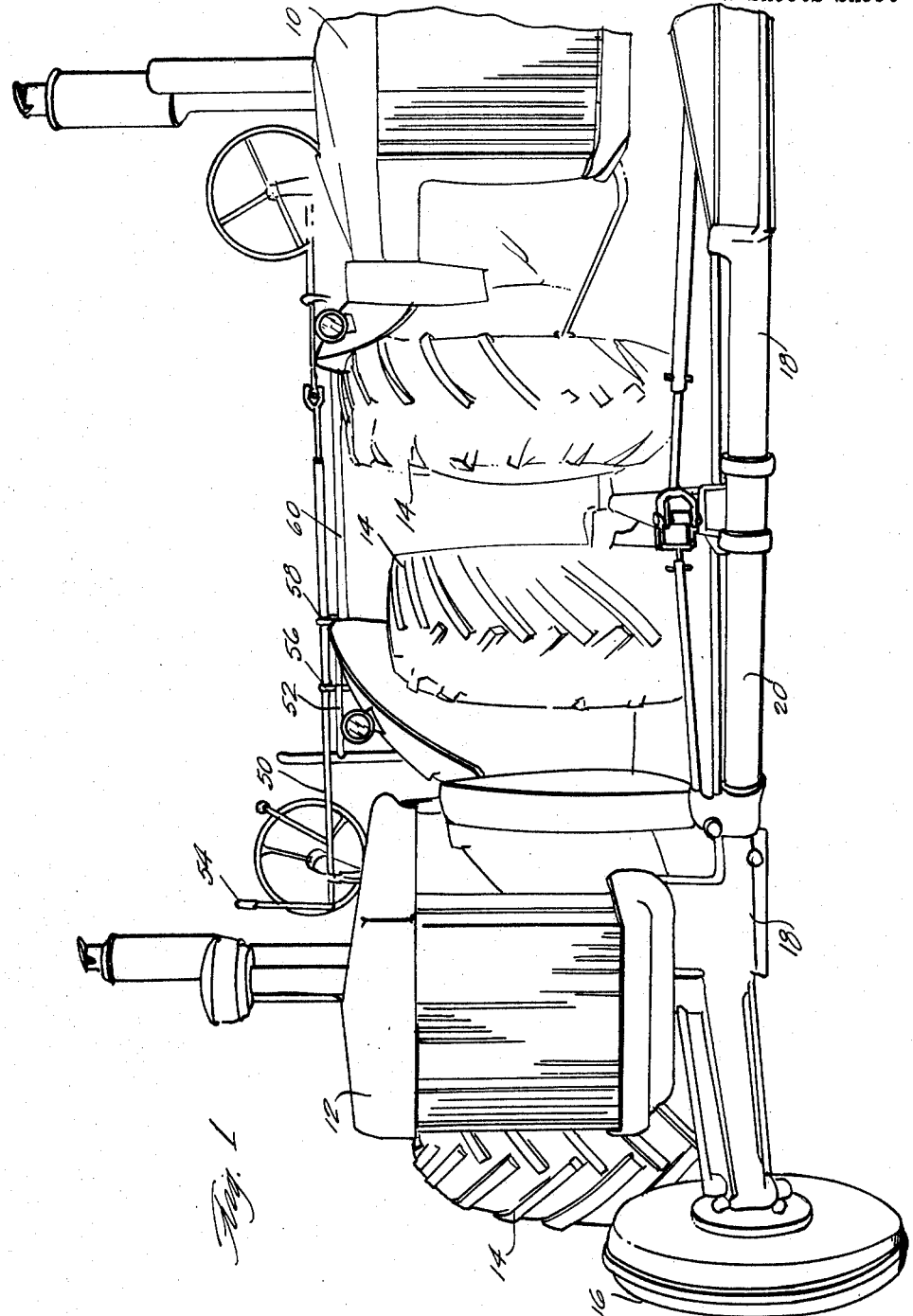

The present invention relates to an two tractor hookup in which the tractors are arranged in side-by-side array, and more particularly the invention relates to providing a single pull bar at the rear of the array and in which the front axles are made common by hooking them together with the structure of the present invention.

A more particular feature of the invention provides for clutching one tractor to the other so that the speeds thereof may run in side-by-side and so that the throttle is controlled by either the right or the left or by selectively the right one over the other by a shaft mechanism to adapt for turning corners without using braking devices.

A further object of the invention provides for throttling only one tractor in order to make a turn by the other around the first tractor and depending upon the size of the turn to be made.

On one of the tractors, there may be provided smaller tires so that the ractor may pull in third gear.

By the arrangement of the invention, steering is accomplished easier and, as described below, the front axle may be made in several different ways, but the preferred arrangement is such that the front axles are in alignment while the tractor is proceeding along a forward course, and the same is true while both tractors proceed along a rearward course while being operated side-by-side.

A further object and advantage of the invention is that the tractors may be returned to single operation with very little difficulty, and both may be steered, throttled and operated apart from each other from the right-hand tractor by having it connected according to the preferred embodiment of the invention.

The above and other objects and advantages of the invention will become apparent upon full consideration of the following detailed description and accompanying drawings in which:

FIG. 1 is generally front perspective view in part with a portion broken away, illustrating the side-by-side arrangement of connecting the front axles in accordance with the preferred embodiment of the invention; and FIG. 2 is a general plan view of the side-by-side two tractor hookup showing the front and rear connecting means and the broken joints disposed intermediate the front and rear means.

Referring now to the drawings, there is shown in side-by-side arrangement of tractors 10, 12, having rear wheels 14, 14, and front wheels 15, 15, connected to and supported from the conventional mounting structures 18, 18, which are in turn coupled together by a side-by-side coupling axle mechanism 20, as shown.

There is also provided in pivotable arrangement thereto coupled from the axle mechanism 20, a longitudinal bar means 22, which has the after end 24 thereof, coupled to a draft bar 26, which is pivotally mounted and connected to a coupling bar 28, 28, respectively, which in turn is pivotally connected by pivot means 30, 30, to a guide ram bar 36, 36.

Thus, it is seen that the hookup arrangement described for two tractors in side-by-side arrangement includes the several elements so each tractor can twist or turn one way or the other, from left to right, and still pull evenly without putting or placing undue strain on any part of the main frame of the assembly where it might and would be in danger of straining or breaking the several components. In changing back from the side-by-side arrangement to the normal operation for each tractor, all there is to be done is to jack up the front axle, take off the bolts from the front axle and then the necessary pins of the drawbar and replace the front wheel thereon. This can be done in practice by the inventor in 55 minutes, including hooking up the steering rod.

There is also a feature of the invention to operate the tractors in side-by-side so that the clutching and the throttle means between the tractors is provided to operate in unison by a sole operator, in which, as shown in FIG. 1, coupling pipes or rods 50, 52, provide for controlling the throttle 54, by means of a square slip shaft or pipe 50, 52, slipping into bearings 56, 58, so that the throttle is controlled by the operator of the righthand tractor by the shafts or rods, as shown.

Also within the contemplation of the present invention is a clutch inter-coupling from one tractor to the other, so that the lefthand tractor's clutch (not shown) is operated by a similar pipe or rod 60, which enables the clutches of each of the tractors to be operated from a single position by the operator of the tractor 12.

It is seen that in making a turn or driving the tractor about a corner, the brakes need not be used, and one merely needs to throttle one of the tractors ahead of the other so that it will turn as desired and depending upon the radius of the turn.

The drawings show how the steering arrangement is accomplished, so that the front axle can be made in several different ways within the concepts and teachings of the present invention. In backing up the side-by-side tractor arrangement, it is accomplished by using the clutches separately or together, and as desired, and there is seen to be several and many advantages to having the two tractors in tandem.

What is claimed is:

1. A two tractor hookup comprising a front axle inter-coupling mechanism between the mating front axles of two tractors, a longitudinal pull bar means coupled between the tractors from the front axle, inter-coupling mechanism to a center point of a rear draw or draft bar, a pivot means centrally mounted on each tractor, a guide arm bar connected between the pivot means and a pivot coupling ont he longitudinal pull bar, a coupling bar mounted between and from the pivot means to the proximate end of the rear draft bar by a further pivot coupling.

2. The invention of claim 1 wherein the tractors may be decoupled by dismantling the front axle inter-coupling mechanism and the longitudinal bar means.

3. The invention of claim 2 wherein clutch and throttle means between the tractors is provided to operate the side-by-side hookup by a sole operator.

(References on following page)

References Cited

UNITED STATES PATENTS

| | | | | |
|---|---|---|---|---|
| 1,310,604 | 7/1919 | Burgess | | 180—14 |
| 1,608,172 | 11/1926 | Herr. | | |
| 1,675,013 | 6/1928 | Young | | 180—6.48 X |
| 2,808,117 | 10/1957 | Garrett | | 180—6.48 |
| 2,678,105 | 5/1954 | Peterson | | 180—6.48 |

KENNETH H. BETTS, Primary Examiner

U.S. Cl. X.R.

180—6.48; 280—400, 473, 495